Figure 1:
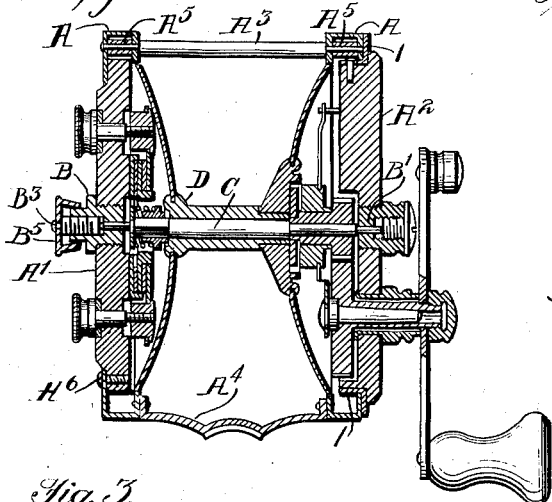

P. CATUCCI.
FISHING REEL.
APPLICATION FILED MAR. 7, 1910.

1,005,154. Patented Oct. 10, 1911.
2 SHEETS—SHEET 1.

Witnesses:
Louis Sanders Jr.
Werner E. Arnold.

Pliny Catucci
Inventor:
By
Louis M. Sanders
Atty

P. CATUCCI.
FISHING REEL.
APPLICATION FILED MAR. 7, 1910.
1,005,154.
Patented Oct. 10, 1911.
2 SHEETS—SHEET 2.
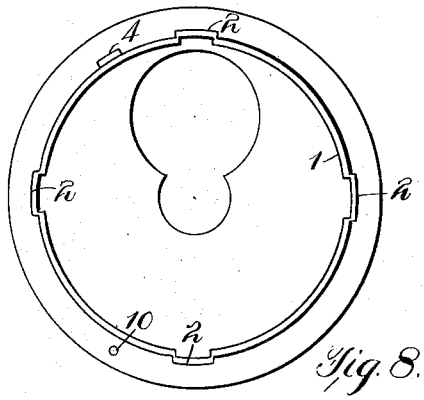
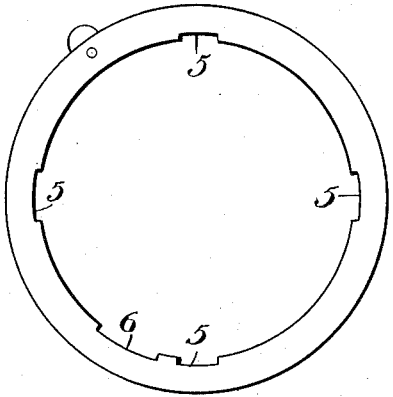
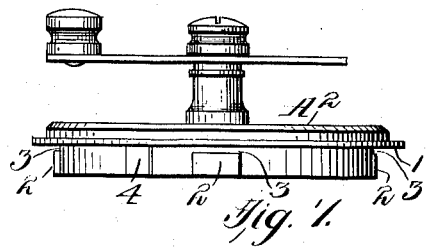
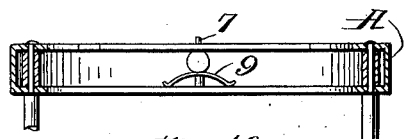
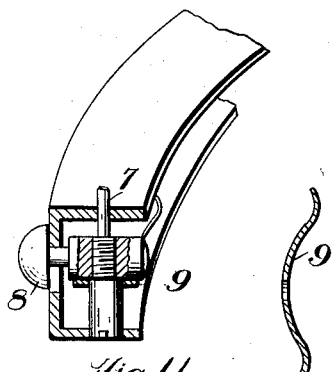
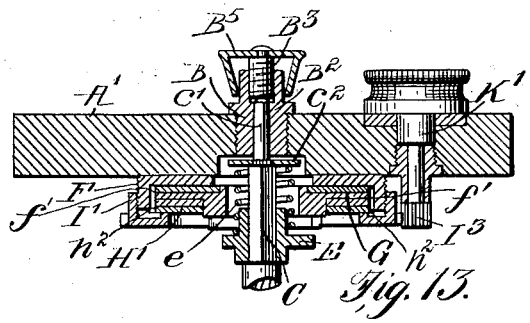
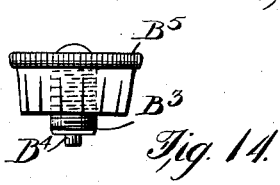
Witnesses:
Louis Sanders Jr.
Werner E. Arnold
Pliny Catucci Inventor
By
Louis M. Sanders
Atty.

UNITED STATES PATENT OFFICE.

PLINY CATUCCI, OF NEWARK, NEW JERSEY, ASSIGNOR TO A. F. MEISSELBACH & BRO., OF NEWARK, NEW JERSEY, A CORPORATION OF NEW JERSEY.

FISHING-REEL.

1,005,154.   Specification of Letters Patent.   Patented Oct. 10, 1911.

Application filed March 7, 1910. Serial No. 547,925.

*To all whom it may concern:*

Be it known that I, PLINY CATUCCI, a citizen of the United States, residing in the city of Newark, county of Essex, and State of New Jersey, have invented certain new and useful Improvements in Fishing-Reels; and I do declare the following to be a full, clear, and exact description of the same, such as will enable others skilled in the art to which it pertains to make, construct, and use the same.

The object of my invention is to improve the general construction of fishing reels, and more particularly in the following respects: To construct the head rings of metal plates which are pressed into rings of channel shape in cross section so as to reduce their weight to a minimum, consistent with the greatest possible strength, and to form the frame in connection with said rings of trusses, so arranged as to materially strengthen it. To construct both front and rear head plate connections with the head ring in such a manner as to make both plates readily detachable for purposes of inspection, cleaning, and oiling. To so construct the spindle pivot bearing as to allow for adjustment for end thrust, and at the same time prevent binding between the pivot and bearing.

A further improvement resides in the particular manner of securing the front head plate to the head ring, and the method of incasing the plate in a flanged metal ring so as to secure accurate adjustment and alinement of the spindle pivot bearings.

Another object of my invention is to construct the parts of a fishing reel in such a manner as to provide for an adjustable "drag" upon the paying out of the fishing line, upon what are known as free spools or free running spools. This class of spools has now become well recognized in the art and is fully exemplified in the patent granted to myself and A. F. Meisselbach jointly on the 3d day of August, 1909, No. 929,867. In reels of this type, the gear connection between the winding crank and the spool proper is of such character that the line which is wound upon the spool may pay out freely, but with a slight movement of the crank, the gear connections are made operative almost instantly. In winding up the line in deep sea fishing, and particularly with some classes of game fish, it is necessary to play the fish a considerable time in order to tire him out, before it is possible to land him. To do this requires considerable skill on the part of the angler, and if continued for some length of time, it becomes very tiresome, because of the close attention required to the operation of the spool; and at the same time to preserve such control upon the crank as to be able to wind up the line whenever there is the slightest bit of slack therein. Moreover, in this class of spools, the drag has usually been provided for by the angler placing his thumb upon the line as it lays upon the spool, or by the so-called click wheel and pawl, or both. This is very unsatisfactory, and usually inadequate to accomplish the results sought.

It is one of the purposes of my invention to place upon the axis or spindle of the spool a tension device of such a character as to entirely obviate this manipulation of the line by means of the thumb of the angler, such tension device being of a nature to adjustably retard the paying out of the line with varying degrees of tension according to the will of the angler, and yet permit at all times the free winding in of the line. The degree of this drag for certain classes of fish should be adjustable, and vary from almost nothing to enough to produce the effectual stoppage of the paying out of the line. This, also, must be entirely free from the winding operation.

Figure 2:
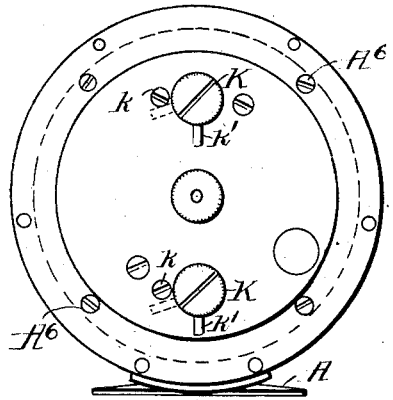
Figure 3:
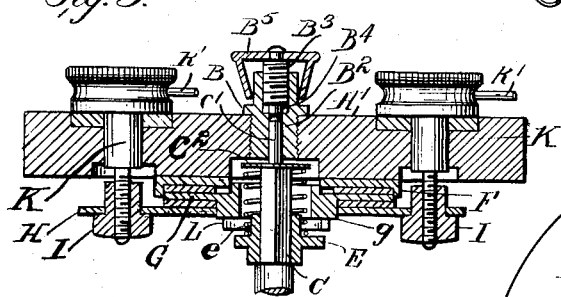
Figure 4:
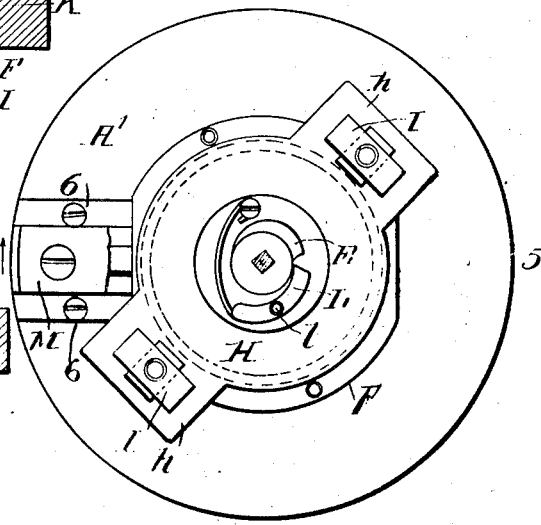
Figure 5:
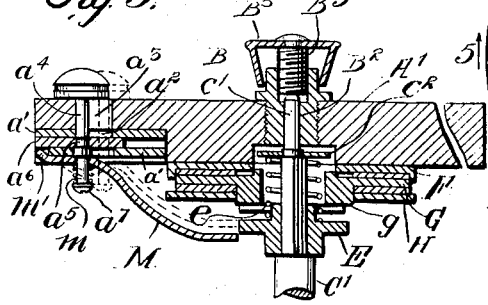
Figure 6:
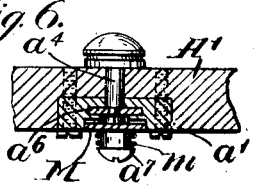

In carrying out the objects of my invention, I make use of the structures illustrated in the accompanying drawings, wherein, Figure 1 illustrates a longitudinal section of a fishing reel provided with my improvements. Fig. 2 illustrates the end view of the fishing reel, showing the external means of adjustment for the drag. Fig. 3 is an enlarged sectional view showing parts of the drag structure in detail. Fig. 4 is an inside plan view of the head plate which carries the drag structure. Fig. 5 is a section on line 5—5 of Fig. 4. Fig. 6 is a section on line 6—6 of Fig. 4. Fig. 7 is a side view of a head plate. Fig. 8 is an under plan view of the same. Fig. 9 is a plan view of the head ring, showing the notches therein, for securing the head plate to the head ring. Fig. 10 is a sectional view of the head ring, showing the locking device. Fig. 11 is a perspective view partly in section of the locking device.

Fig. 12 is the view of the spring which actuates the locking device. Fig. 13 is a sectional view similar to Fig. 3, showing a modified form of drag adjustment. Fig. 14 is a side plan view of the dust cap and thrust bearing adjustment screw. Fig. 15 is a sectional view of the rear head plate showing the method of securing the parts together.

In Fig. 1 of the drawings, I have illustrated a free running reel in which the driving mechanism of the spool is substantially the same as that illustrated in the prior patent to A. F. Meisselbach and myself, above referred to, and fully described in such patent, so that no description of this mechanism is deemed to be necessary in this specification. Suffice to say that the mechanism is of such character as to permit the free automatic paying out of the line from the spool and yet to be instantly under the control of the angler upon the slightest movement of the crank in the winding-up direction; this movement effectively and immediately checking the paying out of the line, the further movement of the crank resulting in the winding up of the line upon the spool. All these features are clearly pointed out and fully described in said prior patent. As above set forth, this free paying out of the line, in some classes of fishing, requires effective and immediate control other than through the crank or winding-up mechanism. In order to provide such a control as already stated, I interpose in the paying out of the line, an adjustable tension or drag, so that the strain upon the line due to the pull of a fish thereon can be controlled by mechanism other than the winding mechanism. This structure I will now proceed to describe in detail.

The reel frame is composed of the head rings A, A, which are of peculiar truss construction, and are connected and solidly baced by the cross bars, $A^3$, and the foot plate $A^4$. The rings, A, A, are of peculiar construction and form an important feature of my invention. Each ring is made by cupping a disk of metal, so as to draw a circular flange around the margin of the disk; a circular piece is then cut from the bottom of the cup, after which a sectional die is fitted into the resulting flanged ring, and the portion of the flange which projects above the face of the die is then spun partially down and subsequently the incomplete ring is placed in a heavy press and the partially spun flange is pressed down flat upon the upper face of the sectional die, thus completing the forming operation. The die is then removed from the interior of the ring, which is then trimmed up and is ready to be drilled for the reception of the cross bars or rods. The resulting head ring is channel shaped in cross-section, with the flanges projecting toward the center, thus forming the strongest and lightest known construction— the circular truss.

As a means for connecting the rings A, A, as above described, I drill holes through the flanges, through which are inserted the shouldered cross bars $A^3$, the reduced ends of which snugly fit the holes and in the case of the rear head plate I have shown these reduced ends projecting through and riveted down upon the outside ring flange. In order to still further strengthen the ring flanges, I insert between them the short sections of metal tubing $A^5$, in registry with the holes, passing the cross bar ends through the holes and tubes then riveting the cross bar ends upon the outside, as shown. The foot plate $A^4$, is also secured to the flanges of the head rings by rivets which pass through the flanges of the foot plate, and the flanges of the rings. The resulting frame is of extreme strength and rigidity, and will not become distorted under the severest of ordinary use, while it possesses the very desirable quality of lightness.

I have shown two methods of securing the head plates, $A^1$, and $A^2$, in position in the head rings, one for securing the rear head plate and the other for securing the front head plate. I prefer to use both methods as shown, in actual practice, but I do not wish to be considered as confining myself to this practice, as it will be readily seen that either method may be adopted for securing both plates to their respective rings. The method shown is preferred, for the reason that it is seldom necessary to remove the rear head plate and it may therefore be more permanently though not less rigidly fixed.

As shown, the outside flange of the rear head ring A, is somewhat wider than the inner flange, so that the plate $A^1$, may be of a diameter sufficient to pass the inner flange and rest flatly with the recess of the plate against the outer flange, as clearly shown in the drawing, where it may be held firmly in position by screws, $A^6$, as in Fig. 1, or which pass through the outer flange and into the elbow nuts $A^7$, one arm of which bears upon a chamfered notch in the inner margin of the plate $A^1$ and the other arm bears upon the outer flange of the ring A, as shown in Fig. 15. The several screws $A^6$ thus rigidly secure the plate $A^1$ to the ring A, while when necessary the plates may be readily removed by removing said screws.

In Figs. 7 to 12, inclusive, I have shown a novel form of front head plate and means for fastening the same to the head ring as shown in Fig. 1. It is to be understood that either or both of the head rings, $A^1$, $A^2$, may be secured to the head rings, but in Fig. 1, only the front head plate is shown as fastened in the novel manner. The plate $A^2$ is provided with a flanged metal ring 1, which fits over and is rigidly secured to the circumferential recess on the under side of the plate, as shown in section in Fig. 1. The flange of this ring 1 is sufficiently wide to give it a full bearing upon the inturned flange of the head ring A. The ring 1 is provided with the four bosses 2, diametrically located upon its outside cylindrical portion, such bosses being, however, of less depth than the width of the ring, so as to leave the narrow channels, 3. The single stop boss, 4, is also provided of a depth equal to the ring 1. The head ring A has its outside flange notched at 5 to correspond in depth width and position with the four bosses 2, upon the ring 1. I also provide the notch, 6, in the head ring to correspond in position with the boss 4 of the ring, but of two or three times its width. If, now the plate $A^2$ and the ring A are brought together with the bosses and notches properly located, and given a relatively slight turn the solid portion of the flange of the head ring A will take into the channels 3, while the boss 4 will form a stop against the end of the notch 6, thus securing the head ring and plate together against lateral displacement.

In order to lock the parts in position, I provide the small spring bolt 7 in the channel of the head ring A, as shown in Figs. 10 and 11, such bolt having the external slide button 8 connected therewith, by which the bolt may be withdrawn against the pressure of the small flat spring 9. The flange of the ring 1 is provided with the small hole 10 to receive the exposed end of the bolt 7 when the head plate $A^2$ with its ring 1 are brought together in the position with the head ring A, and given the slight turn as above described. When thus locked together, it is only necessary to depress the bolt 7 by means of the button 8 and give the plate $A^2$ a slight backward turn, to separate them.

In the prior Patent, No. 845,805, of March 5, 1907, granted to A. F. Meisselbach, there is shown a novel form of spindle bearing and end thrust takeup. This possesses the fault that it is not always possible to properly aline the bearings so as to avoid a slight binding between the bearing proper and the pivot, due, of course, to the slight mechanical inaccuracies in the threading of the several adjusting parts. In my present construction these difficulties are entirely obviated, and yet all of the valuable features of the older structure are preserved.

In the head plate $A^1$, I secure in any suitable manner as by screwing therein the bearing bushing B, which has the accurately alined bearing $B^2$ therein to receive the spindle pivot $c^1$. The external portion of this bushing is cylindrical as shown, while the outer end is provided with a screw threaded socket in alinement with the bearing $B^2$. Into this socket is screwed the end thrust adjusting stud $B^3$, which is provided with the central bearing boss $B^4$ which bears upon the end of the spindle pivot $c^1$. In this manner all end play of the spindle C may be taken up without disturbing the alinement of the long cylindrical bearing $B^2$. The stud $B^3$ is provided with the cap $B^5$ which has its flange slitted and inwardly turned to frictionally engage the external cylindrical portion of the bushing B and thus serve not only as a dust cap but also to prevent the adjusting stud $B^2$ from too readily turning. The bearing $B^1$ is of any usual type and need not be explained in detail. Mounted on these bearings B, $B^1$, is the usual spindle C upon which is secured the spool D. The drag end of the spindle is provided with the squared portion $c$ and with the pivot portion $c^1$ as shown. Rigidly secured upon the spindle C is the washer $c^2$, such washer being located at the juncture of the pivot $c^1$ and the squared portion $c$.

Mounted upon the squared portion $c$ of the spindle is the cam ratchet tooth E, in such a manner as to be slidable along said squared portion. Between this cam ratchet tooth E and the washer $c$, I locate a spiral spring $e$, the tendency of which is to force the cam ratchet tooth E against the shoulder formed by the squared portion $c$. This is clearly illustrated in each of Figs. 3 and 5.

Rigidly secured to the inner face of the head plate $A^1$, is the cup shaped friction disk F, having a central aperture concentric with the axis of the spindle C. In this cup-shaped friction disk F, I mount a coöperating friction disk G, said plate being provided with a hub $g$ as clearly shown. Upon the hub $g$, I mount a spring plate H, said plate having the extension arms $h$, extending in diametrically opposite directions as clearly illustrated in Fig. 4. These extension arms are provided with squared nuts I, as shown clearly on the drawings. Projecting through the head plate A in registry with the squared nuts I, are the adjusting thumb screws K, K. It will now be seen that by screwing up the thumb screws K, K, into the nuts I, I, the plate H will be made to press the friction disk G upon the cup-shaped friction disk F and this pressure will be varied in accordance with the number of turns given to the thumbscrews K, K.

Mounted upon the hub $g$ of the friction disk G, is the spring pawl L, such spring pawl being pivoted at $l$, and which, it will be seen, will lie directly in the path of the cam ratchet tooth E, whenever it is depressed against the spring $e$, to a position where its face will lie against the hub $g$ of the friction disk G. In such depressed position, it will be noted, from an inspection of Fig. 4, that the rotation of the spool spindle C will cause the tooth E to engage the pawl L, which, as above described, is pivotally connected with the friction disk G and consequently a rotation of the spindle in the opposite direction will cause a simultaneous rotation of the friction disk G, which rotation, however, will be retarded in a greater or less degree as the friction plate H, presses the friction disk G, with a greater or less pressure against the cup-shaped friction disk F. The rotation of the spool in the opposite, or wind up direction, however, is not affected in any manner for the reason that the cam ratchet tooth E will ride past the point of the pawl L, thereby permitting the free winding in of the line; while the paying out of the line will be retarded just as described. The tension of this retardation will depend, of course, upon the adjustment of the thumbscrews K, K, and these being external are always within the control of the operator.

Upon reference to Fig. 2, it will be noted that I have provided stop pins or screws $k$, which lie in the path of the laterally projecting pins $k^1$, but which are rigidly secured in the sides of the thumbscrews K, so that the pins $k$ serve in a manner, as an index to the degree of tension applied to the drag mechanism; that is to say, when these pins lie upon one side of the stop pins $k$, the least degree of tension is applied to the drag, and when the pins $k^1$ are swung around to the opposite side of the stop pins $k$, then the greatest of tension is applied to the drag. Intervening positions for the pins $k^1$, will indicate intermediate degrees of the drag, which, of course, are also within the control of the operator. As thus far described, however no means have been provided for depressing the cam ratchet tooth E into engagement with the pawl L. It is obvious that some external means must be provided for this operation, and I will now describe such means.

Adjacent to the front head plate $A^1$, I provide a mortise $a$ in which I secure the metallic block $a^1$, such block being provided with a slot $a^2$, which is adjacent to a similar slot $a^3$, in the head plate $A^1$. Projecting through these two slots, $a^2$, and $a^3$, is the slide pin $a^4$, having the external head as shown in Figs. 5 and 6. This slide pin, $a^4$, is provided with a reduced diameter $a^5$, as shown, upon which is mounted a slide washer $a^6$, which serves to guide the slide pin $a^4$ in its movement in the slots $a^2$ and $a^3$. Mounted upon the inner end of the slide, upon $a^4$, is the bent arm M; said arm being located beneath a compression spring $m$, which spring surrounds the inner end of the slide pin $a^4$, being located beneath the nut $a^7$, and the face of the contiguous portion of the arm M. This arm M has its left hand end $m^1$, bent so as to bear upon a corresponding face portion of the metallic block $a^1$, while its opposite end extends forward, and lies in a position adjacent to the disk portion of the cam ratchet tooth E. The operation of this device is such that when the slide pin $a^4$ is pushed to the opposite end of the slot $a^3$, as shown in Fig. 5, the rear bend, $m^1$, of the arm M, will ride upon the corresponding portion of the block $a^1$ and cause the forward end of the arm M to advance in the path of the cam ratchet tooth E, and simultaneously tilt up into contact with the same and depress it against the spring $e$, so as to bring the tooth into the path of the pawl L; thereby making the drag of the friction plate G effective. When this shifting device is in the position shown in full line in Fig. 5, the arm M is completely free from the disk of the cam ratchet tooth E, thus permitting the free separation of the parts for cleaning and oiling.

In Fig. 13, I have shown a slight modification of the drag adjustment. In this form I provide the disk F with a threaded flange, and substitute for the disk H the circular disk $H^1$, which is provided with the circumferential notches $h^2$, which engage corresponding lugs $f^1$ upon the inner surface of the flange F, to prevent relative rotation. I next provide the flanged ring $I^1$ to screw downward upon the flanged ring $F^1$ and simultaneously bear upon the friction disk G. Upon the circumference of the ring $I^1$ are the rack teeth which engage the pinion $I^3$ mounted upon the thumb-shaft $K^1$, similar in other respects to the thumbscrew K shown in Fig. 3. It will now be seen that a rotation of the thumbshaft $K^1$ will communicate a rotary motion to the ring I thereby screwing it up or down upon the threaded flange F and so cause a greater or less pressure between the friction plates.

In each of the structures thus described it will be noted that the drag of the friction plates may be adjusted from the exterior and that by manipulation of the slide pin $a^4$ the drag, whether light or heavy, may be instantly thrown on or off.

I claim:

1. In a fishing reel, the combination of a reel frame, head plates mounted therein, a spool spindle rotatably mounted in said head plates, a pair of friction plates mounted upon one of said head plates, and relatively fixed against rotation, a relatively rotatable friction disk located between said pair of friction plates, and manually operated means for detachably connecting said friction disk to said spindle to rotate therewith in one direction.

2. In a fishing reel, the combination of a spool spindle, with a pair of friction plates and a friction disk located therebetween, a pawl mounted upon said disk, and a ratchet tooth slidably secured to said spindle, whereby said disk may be completely disconnected from, or caused to rotate in one direction only with said spindle.

3. In a fishing reel, the combination of a spool spindle, a pair of separated friction plates, said plates being fixed against rotation, a friction disk located between said plates, means for adjustably compressing said plates against the faces of said disk, and manually operated means for detachably connecting said disk to said spindle to rotate therewith in one direction only.

4. In a fishing reel, the combination of a spool spindle, a disk located concentrically with respect to said spindle and normally disconnected therefrom, manually operated means for connecting said disk to said spindle to rotate therewith, and means for frictionally retarding the rotation of said disk.

5. In a fishing reel, the combination of a spool spindle mounted to rotate, a disk having a central opening therein, located concentrically with respect to said spindle, a pair of plates fixed against rotation and frictionally engaging the faces of said disk, and manually operated means for connecting said disk to said spindle to rotate therewith in one direction but permit its free rotation in the opposite direction.

6. In a fishing reel, the combination of a head plate, a spindle rotating in bearings in said head plate, a friction plate rigidly secured to said head plate, a second friction plate secured to said head plate and adjustable toward and away from said first named head plate, a friction disk mounted between and frictionally engaging said friction plates, manually operated means for detachably connecting said disk to said spindle to rotate therewith in one direction only, and means for adjusting the pressure of said plates upon said disk.

7. In a fishing reel, the combination of a head plate, a spindle bearing therein, a spool spindle rotatably mounted in said bearing, a friction plate rigidly secured to said head plate, a disk frictionally engaging said plate, manually operated pawl and ratchet mechanism for connecting said disk to said spindle to cause said disk to rotate with said spindle in one direction, and means for adjusting the pressure between said disk and said friction plate, to vary the drag upon said spindle.

8. In a fishing reel, the combination of a head plate, a spindle bearing therein, a spool spindle rotatably mounted in said bearing, a friction plate rigidly secured to said head plate, a disk frictionally engaging said friction plate, pawl and ratchet mechanism connecting said disk to said spindle to cause said disk to rotate with said spindle in one direction, and means for adjusting the pressure between said disk and said friction plate, to vary the drag upon said spindle, and means for disconnecting said ratchet and pawl mechanism to permit the free rotation of said spindle in both directions.

9. In a fishing reel, the combination of a head plate, a spindle bearing therein, a rotatable spindle mounted in said bearing, a pair of friction plates secured to said head plate against rotation, a friction disk located between said friction plates, a pawl mounted upon said disk, a ratchet tooth upon said spindle for engagement with said pawl and means for adjusting the pressure upon said disk to vary the drag upon said spindle and means for shifting said tooth out of the path of said pawl.

10. In a fishing reel, the combination of a head plate, a spindle bearing therein, a rotatable spindle mounted in said bearing, a pair of friction plates secured to said head plate against rotation, a friction disk located between said plates, a pawl mounted upon said disk, a ratchet tooth upon said spindle for engagement with said pawl and means for shifting said ratchet tooth out of the path of said pawl, to free said spindle from the drag.

11. In a fishing reel, the combination of a head plate, a spindle bearing therein, a rotatable spindle mounted in said bearing, a pair of friction plates secured to said head plate against rotation, a friction disk located between said friction plates, a pawl mounted upon said disk, a ratchet tooth slidable upon said spindle for engagement with or disengagement from said pawl, and screw adjusting means for varying the pressure of said plates upon said disk.

12. In a fishing reel, the combination of a head plate, a spindle bearing therein, a rotatable spindle mounted in said bearing, a pair of friction plates secured to said head plates against rotation, a friction disk located between said friction plates, a pawl mounted upon said disk, a ratchet tooth slidably mounted upon said spindle for engagement with said pawl, screw adjusting means for varying the pressure of said plates upon said disk, and means for shifting said ratchet tooth out of the path of said pawl, to free said spindle from the drag.

13. In a fishing reel, the combination of a rotatable spindle, a single ratchet tooth slidably mounted upon said spindle, a friction drag including a disk concentrically located with respect to said spindle, a pawl mounted upon said disk, and means for moving said ratchet tooth into the path of said pawl, to actuate said friction drag.

14. In a fishing reel, the combination of a rotatable spindle, a single ratchet tooth slidably mounted upon said spindle, a friction drag including a disk concentrically located with respect to said spindle, a pawl mounted upon said disk for engagement with said tooth, means for sliding said tooth out of the path of said pawl and means for varying the strength of said drag.

15. In a fishing reel, the combination of a rotatable spool spindle, a ratchet tooth mounted to slide upon said spindle, a spring to hold said tooth in a normally inoperative position, a drag concentrically located with respect to said spindle, said drag including a disk, a pawl mounted upon said disk, and manually operated means for shifting said ratchet tooth against said spring along said spindle into the path of said pawl, whereby said disk and said spindle rotate together in one direction and said spindle rotates independently of said disk in the opposite direction.

This specification signed and witnessed this 2d day of March 1910.

PLINY CATUCCI.

Witnesses:
MERVIN T. SANDERS,
W. B. WALTZINGER.